US012164652B1

(12) United States Patent
Li et al.

(10) Patent No.: US 12,164,652 B1
(45) Date of Patent: Dec. 10, 2024

(54) ANALYZING PRIVILEGE ESCALATION RISKS USING A MULTI-LAYER REASONING FRAMEWORK

(71) Applicant: Amazon Technologies, Inc., Seattle, WA (US)

(72) Inventors: Meng Li, San Jose, CA (US); Vishal Gori, Melrose, MA (US); Zhixing Xu, Sunnyvale, CA (US); Niloofar Razavi, San Jose, CA (US); Oksana Tkachuk, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 464 days.

(21) Appl. No.: 17/546,494

(22) Filed: Dec. 9, 2021

(51) Int. Cl.
*G06F 21/60* (2013.01)
*G06F 21/31* (2013.01)
*G06F 21/45* (2013.01)
*G06F 21/62* (2013.01)

(52) U.S. Cl.
CPC .......... *G06F 21/604* (2013.01); *G06F 21/31* (2013.01); *G06F 21/45* (2013.01); *G06F 21/6218* (2013.01)

(58) Field of Classification Search
CPC ........ G06F 21/604; G06F 21/31; G06F 21/45; G06F 21/6218
See application file for complete search history.

(56) References Cited

U.S. PATENT DOCUMENTS

| 2013/0067583 | A1* | 3/2013 | Naldurg | G06F 21/577 726/25 |
| 2017/0286690 | A1* | 10/2017 | Chari | G06F 21/577 |
| 2018/0295154 | A1* | 10/2018 | Crabtree | H04L 63/1433 |
| 2019/0253427 | A1* | 8/2019 | Kling | G06F 3/0622 |

(Continued)

FOREIGN PATENT DOCUMENTS

WO   WO-2019144039 A1 * 7/2019 ........... G06F 16/986

OTHER PUBLICATIONS

Rhino Security Labs, "AWS IAM Privilege Escalation—Methods and Mitigation," retrieved from Internet: https://rhinosecuritylabs.com/aws/aws-privilege-escalation-methods-mitigation/, Nov. 2021, 17 pages.

*Primary Examiner* — Khalid M Almaghayreh
(74) *Attorney, Agent, or Firm* — Nicholson De Vos Webster & Elliott LLP

(57) ABSTRACT

Techniques are described for analyzing privilege escalation risks within the accounts, roles, and policies that comprise an organization's cloud provider environment. Privilege escalation refers broadly to scenarios in which a principal (e.g., a person or application) is able to gain access to resources or actions in a cloud provider environment that exceed a level intended for that principal. In the context of cloud provider environments, for example, such privilege escalation risks can result from the misconfiguration of policies and permissions attached to identities (e.g., users, groups of users, or roles) within an organization's environment. A multi-layer reasoning framework is used to build an (Continued)

ontology model of an organization's identities and relations among the identities, including defined access relationships, permission mutation relationships, and credential mutation relationships. The framework is further used to query the ontology model to identify particular identities associated with one or more specific types of privilege escalation risks.

20 Claims, 11 Drawing Sheets

(56) References Cited

U.S. PATENT DOCUMENTS

| | | | |
|---|---|---|---|
| 2020/0351298 A1* | 11/2020 | Paturi | H04L 67/535 |
| 2020/0358804 A1* | 11/2020 | Crabtree | H04L 63/1433 |
| 2021/0234889 A1* | 7/2021 | Burle | H04L 63/1433 |
| 2022/0060497 A1* | 2/2022 | Crabtree | G06N 20/00 |
| 2022/0060507 A1* | 2/2022 | Crabtree | H04L 63/1433 |
| 2022/0103566 A1* | 3/2022 | Faulkner | H04L 67/06 |
| 2022/0210162 A1* | 6/2022 | Agarwwal | H04L 63/104 |
| 2022/0210202 A1* | 6/2022 | Crabtree | G06F 16/2477 |
| 2023/0123477 A1* | 4/2023 | Luttwak | H04L 63/20 |
| | | | 726/25 |
| 2023/0161871 A1* | 5/2023 | Heller | G06F 21/53 |
| | | | 726/22 |

* cited by examiner

ANALYZING PRIVILEGE ESCALATION RISKS USING A MULTI-LAYER REASONING FRAMEWORK

BACKGROUND

Cloud provider networks enable users to use a variety of computing-related resources such as compute resources, storage resources, networking resources, and the like. When a user or application interacts with a cloud provider network (e.g., using an application programming interface (API), command line interface (CLI), or web-based console provided by the cloud provider network), the user or application typically is required to provide security credentials used by the cloud provider to authenticate the user or application and to determine whether the user or application has permission to access the requested resources or actions. The security credentials can include, for example, usernames and passwords, access keys, and the like.

BRIEF DESCRIPTION OF DRAWINGS

Various embodiments in accordance with the present disclosure will be described with reference to the drawings, in which.

DETAILED DESCRIPTION

Figure 1:
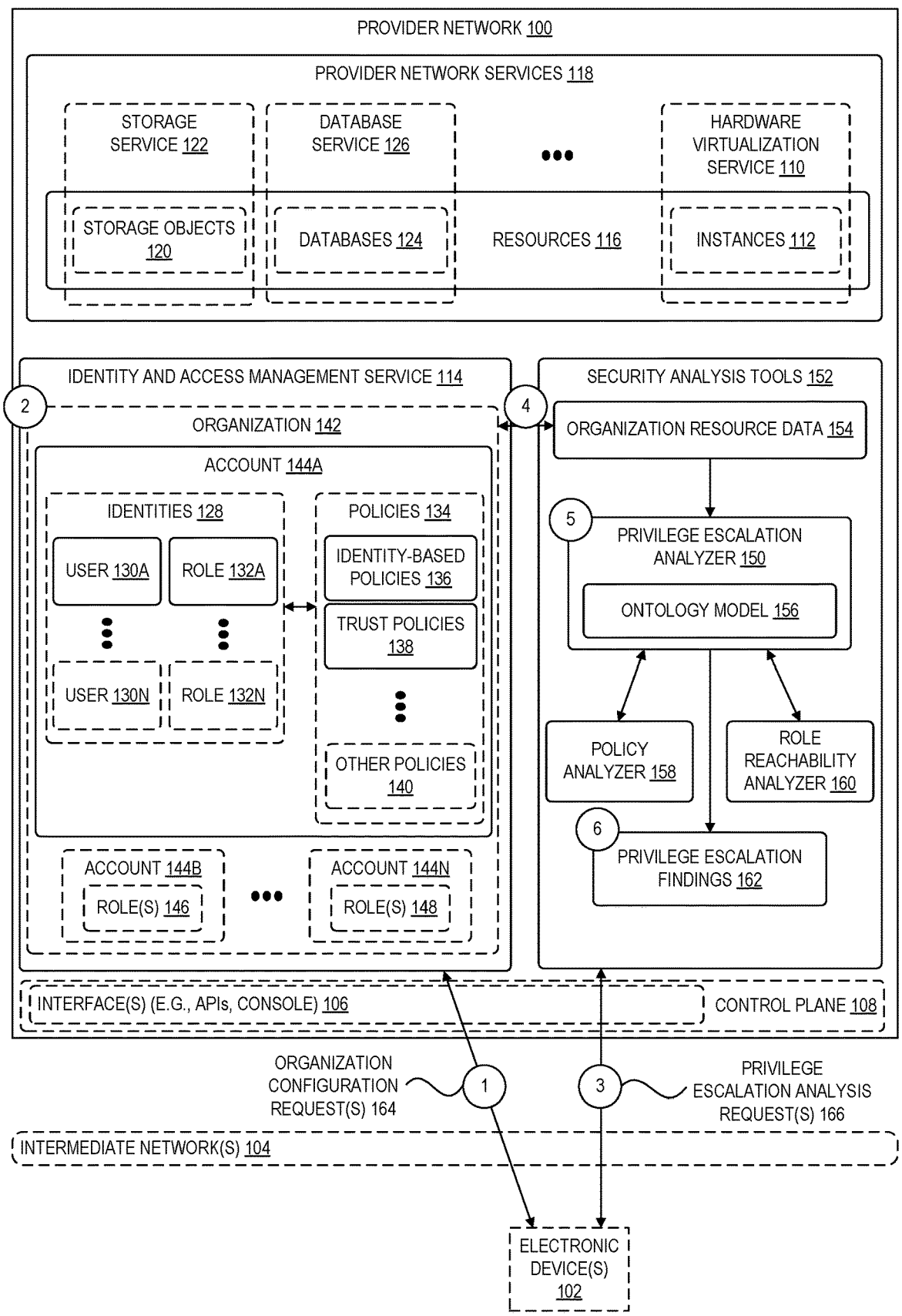
FIG. 1 is a diagram illustrating an environment for using a multi-layer reasoning framework to identify privilege escalation risks within a set of identities managed by a cloud provider according to some embodiments.

The present disclosure relates to methods, apparatus, systems, and non-transitory computer-readable storage media for analyzing privilege escalation risks within the accounts, roles, and policies that comprise an organization's cloud provider environment. Privilege escalation refers broadly to scenarios in which a principal (e.g., a person or application) is able to gain access to resources or actions in a cloud provider environment that exceed a level intended for that principal. In the context of cloud provider environments, for example, such privilege escalation risks can result from the misconfiguration of policies and permissions attached to identities (e.g., users, groups of users, or roles) within an organization's environment. According to embodiments described herein, a multi-layer reasoning framework is used to build an ontology model of an organization's identities and relations among the identities, including defined access relationships, permission mutation relationships, and credential mutation relationships. The framework is further used to query the ontology model to identify particular identities associated with one or more specific types of privilege escalation risks. Among other benefits, the ability to identify and remedy the presence of such privilege escalation risks enables users to increase the security of their computing resources, minimize downtime and data loss due to intentional or unintentional misuse of resources, and to streamline the secure configuration of the identities within an organization.

Modern cloud services providers conventionally offer integrated features for authentication and authorization to their customers. An identity and access management subsystem of a cloud provider network, for example, may provide the concepts of accounts and users within an account for authentication of identities. To specify conditions under which resources can be accessed (e.g., data objects, compute instances, etc.), some cloud providers further provide a general-purpose policy language together with the concepts of roles and delegated role assumption. However, due to policy misconfigurations or other oversights, principals in some environments may be able to perform certain actions to escalate their privileges and gain unintended access to resources and actions. Given the large number of identities and policies within many organizations' environments, and the complex relationships among such resources, it can be challenging to identify privilege escalation scenarios.

For example, in a cloud provider, multiple resources can be used for access control such as identity-based policies, resource-based policies, resource-specific access control lists (ACLs), network ACLs, and the like. There are numerous ways to misconfigure these resources such that a malicious or unwitting entity can escalate their privilege and gain unintended access within a system. As a simple example, a user account that is inadvertently assigned permissions to attach user policies to its own user account could attach a new administrator-level policy to itself and thereby gain administrative-level privileges. The consequences of privilege escalation can be significant as malicious entities can potentially exploit a vulnerability to escalate themselves to access or control critical resources in cloud provider user accounts.

To address these challenges, among others, embodiments described herein provide a privilege escalation analysis framework that can be used to identify identities (e.g., user accounts or roles) that may be associated with such privilege escalation risks. In some embodiments, the analysis involves a multi-layer reasoning framework that uses various policy analyzers to analyze an organization's identities and policies for the conditions that can lead to privilege escalation. As indicated above, for example, the privilege escalation analysis framework constructs an ontology model of an organization's identities and relations among the identities, queries the constructed model for defined privilege escalation scenarios, and provides access to identifiers of any identities associated with identified scenarios, among other features.

FIG. 1 is a diagram illustrating an environment for using a multi-layer reasoning framework to identify privilege escalation risks within a set of identities managed by a cloud provider according to some embodiments. A provider network 100 (or "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can use electronic device(s) 102 interact with a provider network 100 across one or more intermediate networks 104 (e.g., the internet) via one or more interface(s) 106, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context. APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 106 can be part of, or serve as a front-end to, a control plane 108 of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance." such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

In some embodiments, a provider network 100 includes an on-demand code execution service (referred to in various embodiments as a function compute service, functions service, cloud functions service, functions as a service, or serverless computing service) can enable users of the provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code.

The hardware virtualization service 110 (referred to in various implementations as an elastic compute service, a virtual machines service, a computing cloud service, a compute engine, or a cloud compute service) can enable users of the provider network 100 to provision and manage compute resources such as virtual machine instances (e.g., instances 112). Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, a provider network 100 includes a container service. A container service can be a container orchestration and management service (referred to in various implementations as a container service, cloud container service, container engine, or container cloud service) that allows users of the cloud provider network to instantiate and manage containers. In some embodiments the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some embodiments, an identity and access management service 114 is a service that enables users to securely control access to cloud provider network resources (e.g., resources 116 associated with various provider network services 118, such as storage objects 120 associated with a storage service 122, databases 124 associated with a database service 126, compute instances 112 associated with a hardware virtualization service 110, and the like). The identity and access management service 114 is broadly used to control who is permitted to authenticate (e.g., sign in) with the cloud provider network 100 and who is authorized (e.g., has permissions) to use resources provided by the cloud provider network. In general, a resource is a concept used to capture the domain of items that can be created, read, modified, or deleted by customers in a cloud provider network 100. Examples of resources also include identities (e.g., identities 128, including example users 130A, . . . , 130N and roles 132A, . . . , 132N) and policies 134 (e.g., including identity-based policies 136, trust policies 138, and other policies 140). FIG. 1 further illustrates the concept of an organization 142, which can include any number of associated accounts 144A, 144B, . . . , 144N, which can also include any number of users and roles (e.g., role(s) 146 associated with account 144B and role(s) 148 associated with account 144N).

In some embodiments, when a person initially creates an account with the cloud provider network 100, the person begins with a single sign-in identity that has complete access to all cloud provider network services and resources associated with the account (e.g., a root user of identities 128). For example, the root user identity may be accessed by signing in with a username (e.g., an email address) and a password used to create the account. Cloud provider networks 100 often advise users not to use a root user for most tasks and instead to create additional user accounts with defined permissions (e.g., including one or more of users 130A, . . . , 130N). In some embodiments, a user can grant different permissions to different user accounts for different resources. For example, a user account might be configured to allow some users complete access to a hardware virtualization service 110, a storage service 122, and other cloud provider network 100 resources. For other users, a user account might allow read-only access to some storage buckets, or permission to administer some instances 112, etc.

In some embodiments, an account includes identity-related objects stored as part of the identity and access management service 114 including, for example, users 130A, . . . , 130N, user groups (not illustrated), roles 132A, . . . , 132N, policies 134, and the like. These resources can be added, edited, and removed by users of the cloud provider network 100 with sufficient privileges, e.g., using a web-based console, API, CLI, or other interface provided by the identity and access management service 114.

In some embodiments, a principal represents a person or application that can make a request for an action or operation on a resource of the cloud provider network 100 (e.g., a resource 116 or a resource of the identity and access management service 114) via one or more identities. The set of identities 128 associated with an account 144A can include any number of users 130A, . . . , 130N and roles 132A, . . . , 132N. A cloud provider network request occurs when a principal uses an identity (e.g., a user or a role) to send a request for an action or operation on a resource. A request can include some or all of the following information: the action or operations that the principal wants to perform, the resource object upon which the actions or operations are performed, the person or application that used an identity (e.g., a user or role) to send the request, environment data (e.g., information about the IP address, user agent, SSL enabled status, time of day, etc.), and resource data (e.g., data related to the resource that is being requested, such as a resource identifier, or a tag name). In some embodiments, the identity and access management service 114 gathers the information contained in a request into a request context, which is used to evaluate and authorize the request.

In some embodiments, for a request to be completed, the identity and access management service 114 determines whether the requesting principal is authorized (e.g., permitted) to complete the request. During authorization, the identity and access management service 114 uses values included in the request context to check for policies that apply to the request (e.g., one or more of policies 134). The identity and access management service 114 uses the policies 134 to determine whether to allow or deny the request. In some embodiments, the policies are stored by the identity and access management service 114 as JavaScript Object Notation (JSON) documents (or using any other data format) and specify the permissions for particular identities. In some embodiments, there are several types of policies 134 that can affect whether a request is authorized including. e.g., identity-based policies 136, trust policies 138, among other policies 140. For example, to provide users with permissions to access resources in their own account, identity-based policies can be configured, while resource-based policies may be used for granting cross-account access to resources. In some embodiments, the identity and access management service 114 checks each policy that applies to the context of a request. If a single permissions policy includes a denied action, the identity and access management service 114 denies the entire request. In some embodiments, an identity and access management service 114 denies requests by default, such that a request is authorized only if every part of a request is allowed by applicable permissions policies.

In some embodiments, once a request is authenticated and authorized, the identity and access management service 114 approves the actions or operations in the request. Operations are defined by a service and include actions that can be performed on or relative to a resource, such as viewing, creating, editing, and deleting that resource. For example, the identity and access management service 114 may support actions such as CreateUser, DeleteUser, CreateRole, and AssumeRole, among many other possible actions. To allow a principal to perform an operation, the action is included in a policy that applies to the principal or the affected resource.

In some embodiments, identity-based policies 136 are permissions policies that are attached to an identity, such as a user, group, or role in an account. In some embodiments, resource-based policies are permissions policies that are attached to a resource such as a storage object 120 or a role trust policy. A resource-based policy controls what actions a specified principal can perform on that resource and under what conditions. In some embodiments, for example, the identity and access management service 114 supports trust policies 138, which can be attached to a role (e.g., one or more of roles 132A, . . . , 132N). Because a role is both an identity and a resource that supports resource-based policies, in some embodiments, both a trust policy and an identity-based policy is attached to a role. Trust policies 138 define which principal entities (accounts, users, roles, and federated users) can assume the role.

In some embodiments, a role is an identity that a user creates in an account that has specific permissions. A role is similar to a user, in that it is an identity with permission policies that determine what the identity can and cannot do. However, instead of being uniquely associated with one person, a role is intended to be assumable by anyone who needs it. Also, a role may not have standard long-term credentials such as a password or access keys associated with it. Instead, when a principal assumes a role, it is provided with temporary security credentials for a role session. Roles can be used to delegate access to users, applications, or services that do not normally have access to the resource. For example, a person might want to grant users in an account access to resources those users do not usually have access to, or grant users in one account access to resources in another account.

As indicated herein, it is desirable to ensure that unintended privilege escalation scenarios do not exist within an organization or other group of identities. In this context, a privilege escalation scenario can exist when a principal is able to use an identity (e.g., one or more of identities 128) to gain access to resources or actions that exceed a level intended for the identity. e.g., based on the misconfiguration of one or more associated policies 134. According to embodiments described herein, to identify such privilege escalation scenarios, a multi-level reasoning framework is described to perform the analysis. In some embodiments, for example, a privilege escalation analyzer 150 is provided as part of security analysis tools 152 provided by the cloud provider 100. As described herein, as part of an analysis performed by a privilege escalation analyzer 130, organization resource data 154 is obtained describing a set of identities to be analyzed and associated resource information (e.g., policies). Based on the organization resource data 154, the privilege escalation analyzer 150 performs a local analysis to build an ontology model 156 representing the identities under analysis and relationships among the identities.

In some embodiments, the analyses described above can be performed in part by using a policy analyzer 158 and role reachability analyzer 160, which represent automated reasoning services used to analyze policies and consequences of policies. A policy analyzer 158, for example, implements software used to translate policies into a mathematical language and then use automated reasoning tools to check properties of the policies. The tools used by a policy analyzer 158 can include automated reasoners called Satisfiability Modulo Theories (SMT) solvers, which use a mix of numbers, strings, regular expressions, dates, and IP addresses to prove and disprove logical formulas. With these tools, the policy analyzer 158 can compare a given policy A against a "probe" policy to determine whether policy A is more permissive than the probe policy. For example, to determine whether an identity A is permitted to mutate the credentials associated with a role B, the policy analyzer 158 can be used to compare a policy associated with identity A against a probe policy that does permit mutating the credentials associated with B. This information, for example, can be added to an ontology model to indicate types of actions that can be performed among a set of identities. Similar to the policy analyzer 158, a role reachability analyzer 160 can be used to analyze policies to determine which roles are reachable from which identities (e.g., other roles or users) within a set of identities, again relying on analysis of policies using automated reasoning techniques. This information can similarly be added to an ontology model to build an understanding of the relationships among a set of identities under analysis.

In some embodiments, as a second analysis layer, a global analysis is performed on the graph model constructed by the privilege escalation analyzer 150 to identify privilege escalation scenarios. For example, graph queries can be executed against the graph model to search for defined privilege escalation scenarios and to return identifiers of identities that are associated with one or more defined scenarios. For example, if a privilege escalation scenario is defined as a case where a first identity A can assume a role B, and the role B can mutate the credentials of another identity (', this pattern can be constructed as a graph query to determine whether such a pattern exists based on the information collected in the first layer of reasoning described above. In some embodiments, the results of this analysis are returned as privilege escalation findings 162, which can be provided to users in any number of different formats.

In some embodiments, at circle "1" in FIG. 1, one or more users associated with an organization 142 use electronic device(s) 102 to generate organization configuration request(s) 164 to configure a set of accounts, identities, policies, etc., associated with an organization (e.g., an organization 142) and to further configure policies 134 associated with some or all of those resources. These identities, for example, may be created to provide authentication for users and processes within accounts (e.g., accounts 144A, . . . , 144N) of the cloud provider network 100. As indicated above, identities represent a principal and can be authenticated and then authorized to perform actions in the cloud provider network 100 and each identity can be associated with one or more policies 134 to determine what actions a user or role can do with which cloud provider network resources and under what conditions. The collection of accounts, identities, and policies may be created, for example, by an organization that intends to use various services of the cloud provider network 100 for various purposes. Furthermore, the collection of accounts, principals, and policies comprising an organization may be modified over time as desired by the organization.

In some embodiments, at circle "2," responsive to the organization configuration request(s) 164, the identity and access management service 114 creates and stores data representing the accounts, identities, and policies. As indicated above, these identities and policies can be added, edited, and removed by external users of the cloud provider network 100 with sufficient privileges, e.g., using a web-based console, API, CLI, or other interface provided by the identity and access management service 114, and data representing the principals and policies can be stored using various types of storage resources managed by the identity and access management service 114.

In some embodiments, at circle "3," the privilege escalation analyzer 150 receives a request 166 to analyze a set of user identities for the existence of potential privilege escalation scenarios. The request can be generated by a user using a web-based console, API, CLI, or any other interface in which a user can identify a relevant set of identities for analysis (e.g., by specifying an entire organization or by selectively identifying two or more identities).

In some embodiments, at circle "4," the privilege escalation analyzer 150 obtains organization resource data 154 related to the identities to be analyzed for privilege escalation risks. The organization resource data 154 generally includes any type of data describing a defined set of accounts, identities, and associated resources (e.g., policies, etc.). In some embodiments, the privilege escalation analyzer 150 obtains the organization resource data 154 using a separate "scanner" service that is configured to scan an identified set of identities, identify relevant policies and other resources, and collect the data into a textual format for analysis (e.g., a listing of all relevant identities, copies or identifiers of relevant policies, etc.).

In some embodiments, at circle "5," privilege escalation analyzer creates an ontology model 156 representing the organization resource data 154. As indicated above, the ontology model generally represents a set of identities (users and roles) under analysis and relationships of interest among the identities. These relationships can include, for example, types of actions that are permitted to be performed by a first identity A to a second identity or resource B (where the second identity can be the same identity). Example relationships of interest include, but are not limited to, permissions mutation relationships (e.g., based on various types of actions that enable one identity to "mutate" permissions associated with another identity), credential mutation relationships (e.g., based on various types of actions that enable one identity to mutate the credentials associated with another identity), access relationships (e.g., based on actions that enable an identity to access another identity or resource), and role assumption relationships (e.g., based on the ability for one identity to assume another role). As indicated above, the existence of such relationships can be identified by analyzing pairs of identities and associated policies to determine whether each such type of relationship exists (e.g., using a policy analyzer 158 to determine whether an identity can perform an action to another identity based on the policies associated with the identities).

In some embodiments, the ontology model is defined as a directed graph using a data model used to describe and model information such as, for example, the Resource Description Framework (RDF), RDF Schema (RDFS), Web Ontology Language (OWL), or other format. The vertices of the directed graph represent identities or resources under analysis, while edges in the graph are used to indicate particular types of relationships between the identities, as described above. In some embodiments, the directed graph can be built incrementally as analyses of pairs of identities is performed and relationships are identified, or as other relevant information is obtained.

Figure 2:
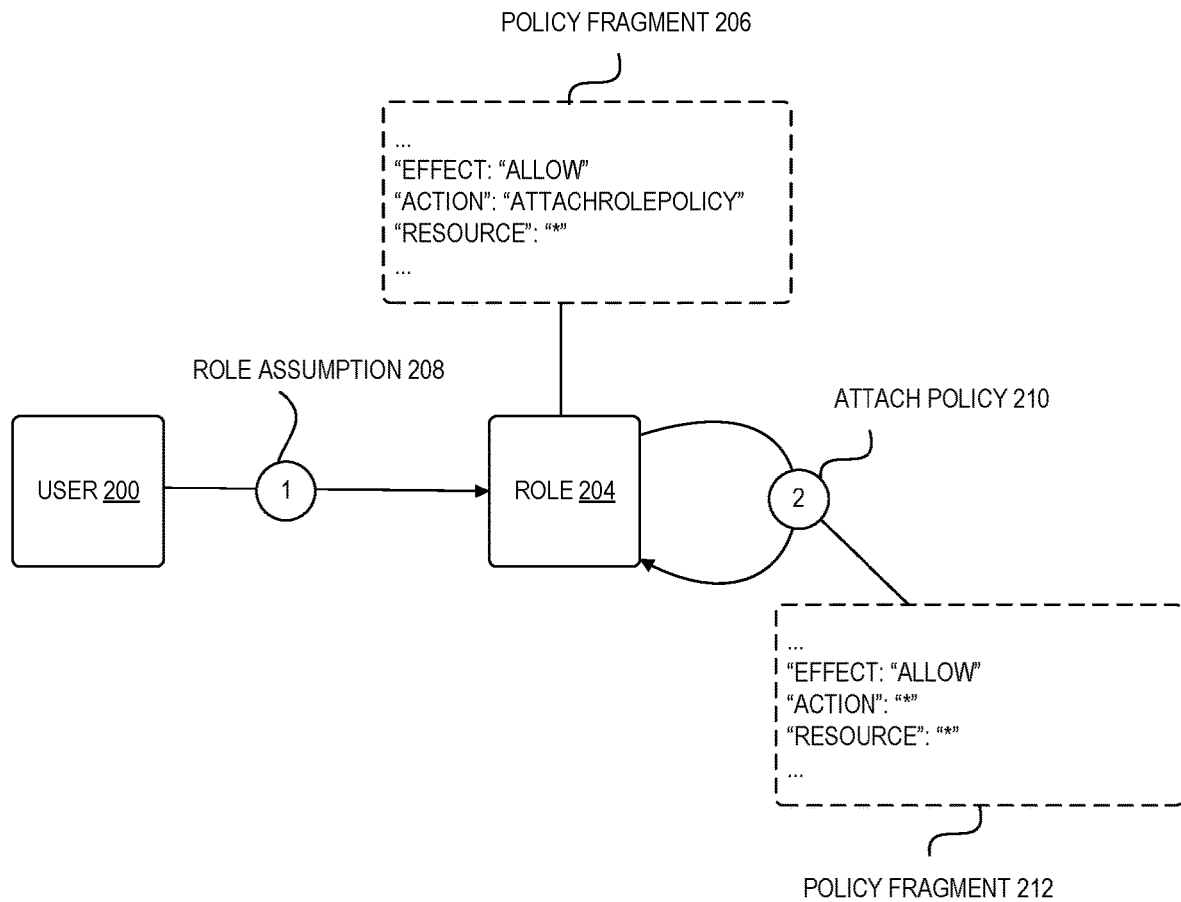
FIG. 2 is a diagram illustrating an example privilege escalation scenario in which a user or role can mutate identity and access management state to add permissions directly or indirectly to itself to gain elevated privileges according to some embodiments.
Figure 3:
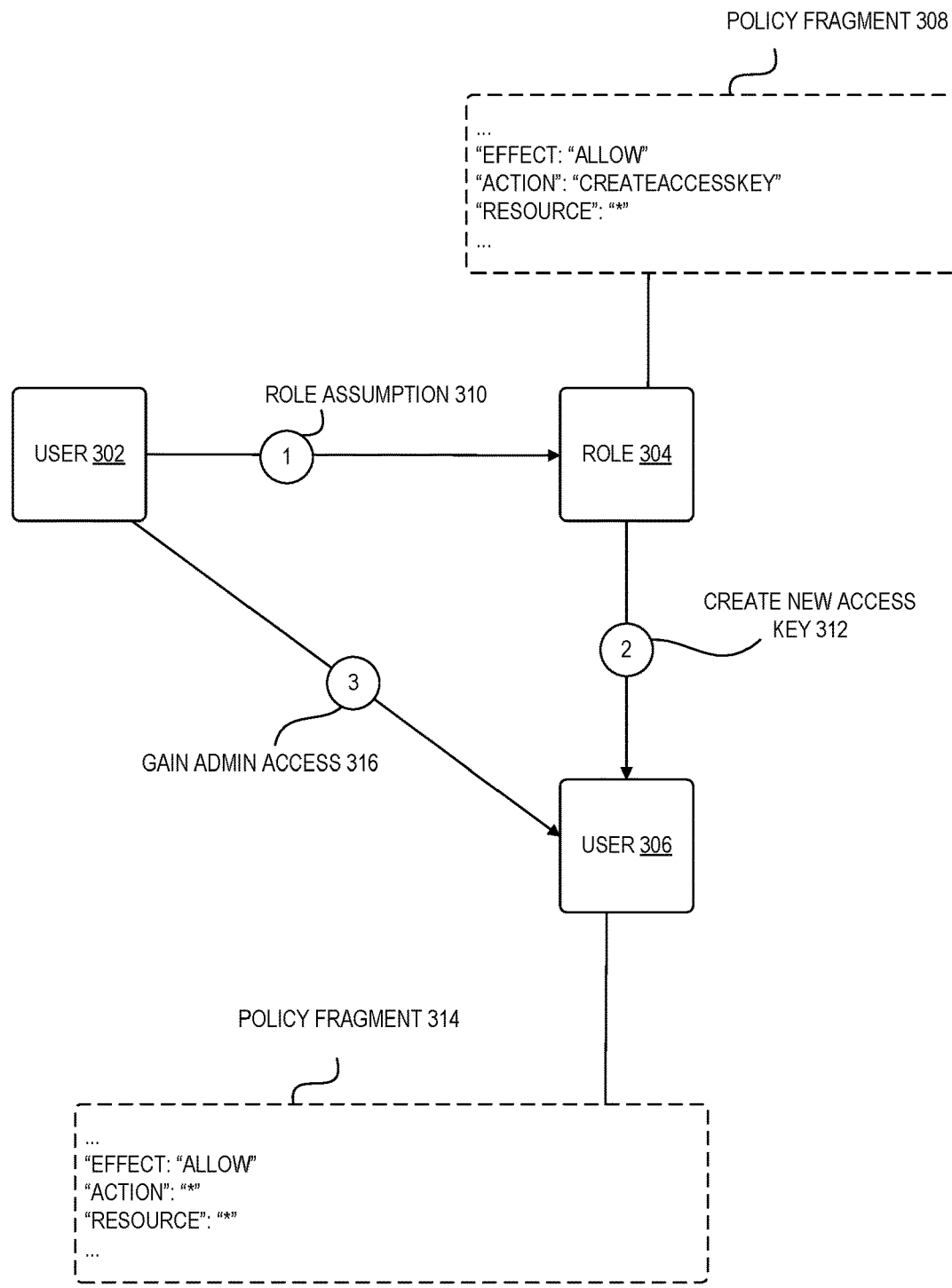
FIG. 3 is a diagram illustrating an example privilege escalation scenario in which a user or role can mutate credentials associated with an identity to gain elevated privileges according to some embodiments.

FIG. 2 and FIG. 3 illustrate examples of privilege escalation scenarios that can exist based on various types of relationships among identities as described above. In FIG. 2, the example graph illustrates a scenario involving a permission mutation action in which a user 202 is able to assume a role 204 and use the role 204 to attach a policy to the role that grants administrative privileges. Although the example shows the use of an "attach policy" action, a permission mutation action generally represents any action by which an identity (user or role) can mutate the state of an identity and access management service to add permissions to itself either directly or indirectly. Other examples of permission mutation actions can include, but are not limited to, actions to attach a user policy (e.g., scenarios in which a user can attach a user policy to itself), actions to add or update an inline policy document that is embedded in a specified role, and the like.

As shown in FIG. 2, for example, the role 204 has an attached policy to including the policy fragment 206. The policy fragment 206 indicates that the role 204 is allowed to attach a role policy to any resource (e.g., including itself). Thus, a user 200 with permissions to assume the role 204 (e.g., illustrated by the role assumption 208 step at circle "1") can perform, at circle "2," an attach role policy 210 action to attach a new policy including the policy fragment 212, which grants administrative privileges to the role 204. A user 200 is thereby able to escalate their privileges to administrative levels by taking such actions even though such administrative-level permissions were not intended for the user 200.

FIG. 3 illustrates an example of another type of privilege escalation scenario that can be present within an organization according to some embodiments. A credential mutation scenario, for example, includes scenarios in which an identity can gain access, either directly or indirectly, to other resources by creating or updating credentials associated with the other resource. FIG. 3, for example, includes a graph illustrating a credential mutation scenario in which a user 302 is able to assume a role 304, use the role 304 to create a new access key for a different user 306, and subsequently gain access to the user 306 using the newly created access key.

As shown in FIG. 3, for example, the role 304 has attached to it a policy including the policy fragment 308 that enables the role 304 to create a new access key on any resource. Thus, at circle "1," a user 302 with permissions to assume 310 the role 304 can, at circle "2," create a new access key 312 for the user 306. The user 306 is attached to a policy including a policy fragment 314 granting administrative privileges to the user 306. Using the newly created access key, the user 302 can then, at circle "3," gain administrative access 316 by accessing user 306. Although FIG. 3 illustrates an example of a user exploiting access to a create access key action, many other types of actions can also result in a credential mutation scenario such as an update login profile action, an update development endpoint action, and the like.

Figure 4:
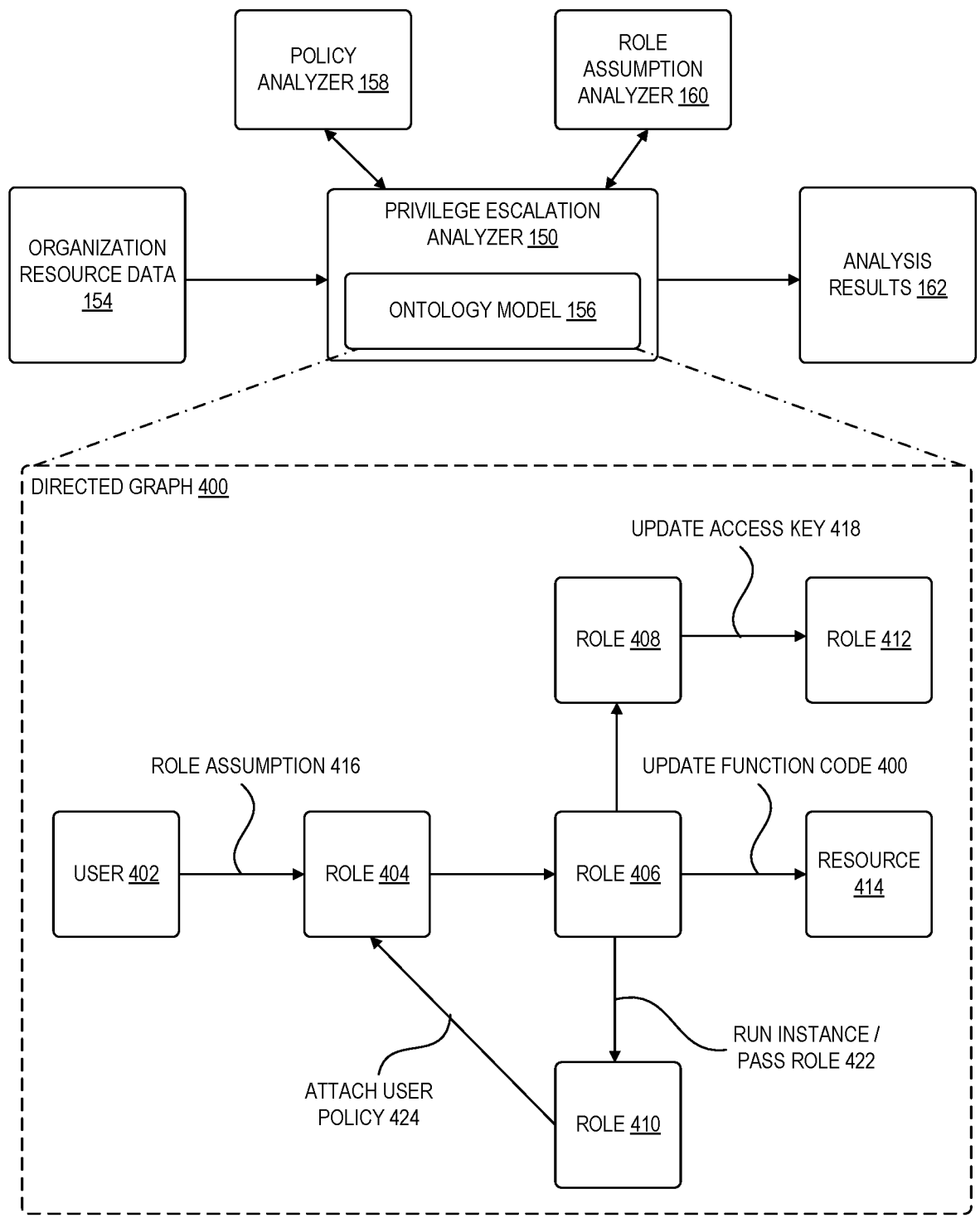
FIG. 4 is an example workflow of a privilege escalation analyzer generating an ontology model representing a set of entities and querying the ontology model to obtain privilege escalation analysis results according to some embodiments.

FIG. 4 illustrates a privilege escalation analyzer 150 creating an ontology model based on the identification of the types of identities and relationships discussed above. As shown in FIG. 4, a privilege escalation analyzer 150 obtains organization resource data 154 and uses a policy analyzer 158 and role reachability analyzer 160 to generate an ontology model 156.

In some embodiments, the ontology model 156 is constructed as a labeled, directed graph 400. The privilege escalation analyzer 150, for example, can create the graph including vertices corresponding to the identities under analysis and edges representing various types of relationships among the identities (e.g., access relationships, permission mutation relationships, credential mutation relationships, etc.). By representing an organization's resource data in this manner, a process for identifying privilege escalation scenarios can be represented as a graph reachability problem. For example, with a formalization of a privilege escalation scenario, it can be converted into a problem of identifying a set of vertices and edges in the graph that satisfy the formalized conditions.

In this example, the privilege escalation analyzer 500 has constructed a directed graph 400 including the following identities: user 402, role 404, role 406, role 408, role 410, role 412. The graph also includes a resource 414. The privilege escalation analyzer 150 further uses the policy analyzer 158 and role reachability analyzer 160 to add policy actions into the graph model including, for example, the edge 416 indicating that user 402 is permitted to assume the role 404. As another example, the edge 418 indicates that the role 408 is permitted to update the access key for the role 412, the edge 420 indicates that the role 406 is permitted to update function code associated with the resource 414, and the edge 422 indicates that the role 406 is permitted to run an instance and pass a role to the role 410. Similarly, the edge 424 indicates that the role 410) is permitted to attach a user policy to the role 404. As indicated above, each of these edges can be derived by analyzing pairs of identities for the abilities to execute such actions based on the policies associated with each of the identities and using the policy analyzer 158 and role reachability analyzer 160. Within the graph 400, various patterns may exist that correspond to known privilege escalation patterns (e.g., where a user is able to assume a role, where the role may transitively be able to assume other roles, and where some role in the role chain is able to modify the credentials associated with another identity).

Figure 5:
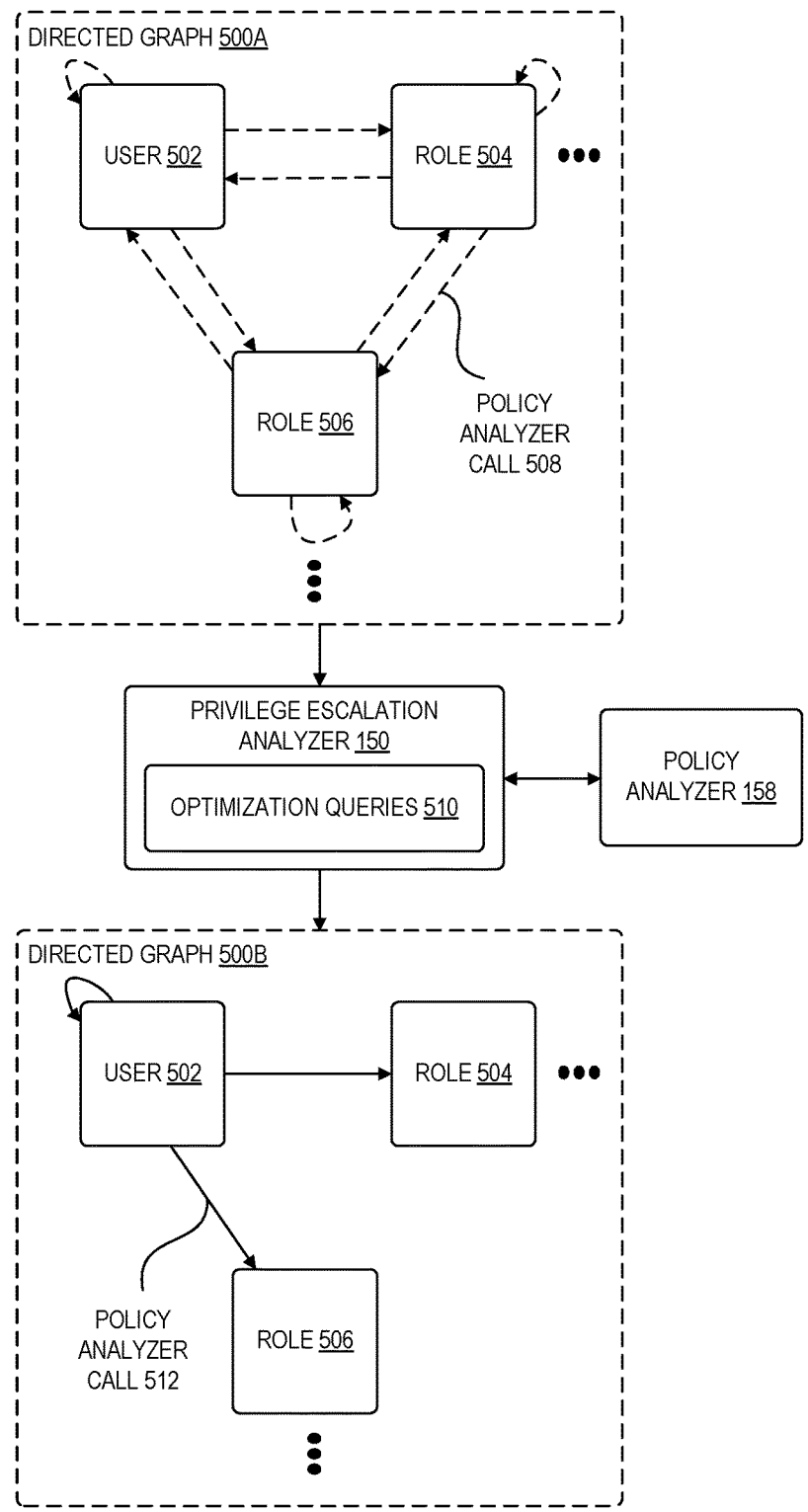
FIG. 5 is a diagram illustrating an example process for reducing a number of queries sent to a policy analyzer service as part of analyzing an ontology model for privilege escalation scenarios according to some embodiments.

Depending on the number of identities being analyzed, the analysis described above can result in a significant number of calls to the policy analyzer 158 and role reachability analyzer 160. In some embodiments, the privilege escalation analyzer 500 performs preliminary queries to reduce a number of calls made to a policy analyzer 158, role reachability analyzer 160, or both. FIG. 5 illustrates a process for reducing a number of such calls according to some embodiments. The directed graph 500A, for example, includes three identities including a user 502, a role 504, and a role 506. The graph 500A further illustrates a number of potential policy analyzer calls (a total of nine calls), including call 508, to determine whether each pair of identities (including each identity paired with itself) permits a first identity to perform a particular type of action on a second identity (where the process may be repeated for the various types of actions to be analyzed).

In some embodiments, the privilege escalation analyzer 150 uses the policy analyzer 158 and optimization queries 510 to reduce the total number of calls to the policy analyzer, as illustrated by the optimized directed graph 500B including fewer total policy analyzer calls (e.g., including policy analyzer call 512). In particular, the directed graph 500A illustrates a number of policy analyzer calls used to determine whether each pair identities (e.g., user 502 with itself, user 502 and role 504, role 504 and user 502, and so forth) is associated with policies that enables a first identity to perform an action involving the second identity (e.g., whether user 502 can perform the attach policy action on role 504, etc.). However, instead of trying every possible pair for such queries, it can be more efficient to identify only the principals that are capable of performing the action in any case (e.g., whether user 502 can perform the attach policy action on any identity). Thus, in some embodiments, the privilege escalation analyzer 150 first uses the policy analyzer 158 to determine, for each identity of a set of identities, whether the identity is permitted to perform a particular action of interest (and may repeat such a process for some or all actions to be analyzed). The privilege escalation analyzer 150 can then execute optimization queries 510 to identify only those pairs of identities requiring additional analysis by the policy analyzer 158.

In some embodiments, once the ontology model 156 is constructed, the privilege escalation analyzer 150 can execute queries to find privilege escalation scenarios. In some embodiments, the conditions for privilege escalation scenarios are defined using a formal specification and the formal specification is used to define queries that include the conditions (e.g., as SPARQL Protocol and RDF Query Language (SPARQL) queries used to query graph data). In some embodiments, the privilege escalation analyzer 150 provides the enriched data model and the SPARQL queries to a rule-based reasoner and graph query engine (e.g., the Apache Jena reasoner) to obtain identifiers of identities associated with one or more defined privilege escalation scenarios.

Figure 6:
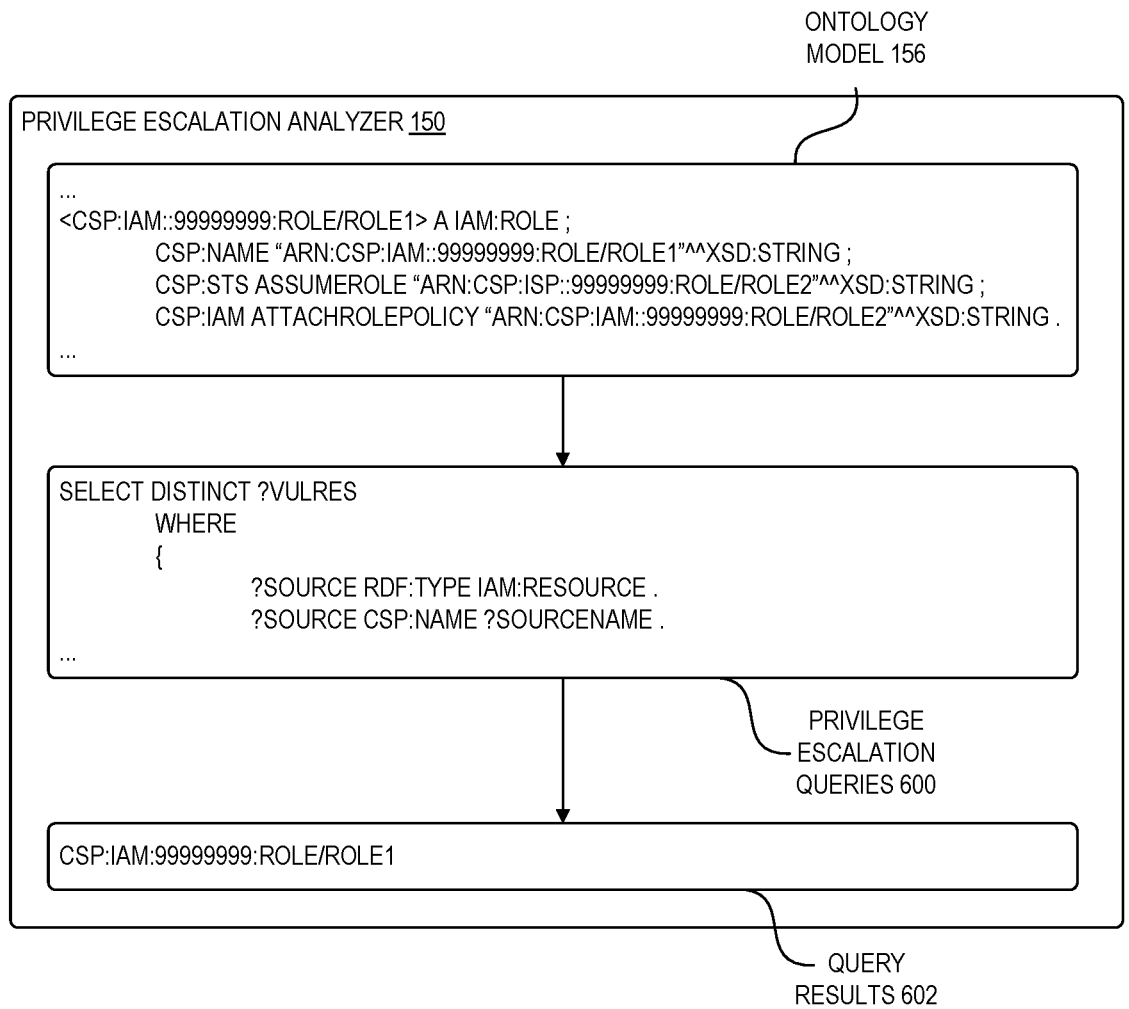
FIG. 6 is a diagram illustrating the example execution of a query against an ontology model to identify identities associated with privilege escalation scenarios according to some embodiments.

FIG. 6 illustrates the execution of one or more queries against an ontology model to identify identities associated with one or more privilege escalation scenarios. As shown, the ontology model 156 includes data stored as a collection of triples using. e.g., the Resource Description Framework (RDF) format, Web Ontology Language (OWL) format, or any other graph-based representation of the data. Each triple, for example, can express information obtained from the policy analyzer 158, role reachability analyzer 160, or other sources, as described above, indicating that a first identity is permitted to perform an action (e.g., an attach policy action, role assumption action, etc.) involving a second identity.

In some embodiments, to identify privilege escalation scenarios within the ontology model 156, the privilege escalation analyzer 150 can execute a set of pre-defined privilege escalation queries 600 against the ontology model 156 (e.g., using a graph-based query engine, such as the one provided by the Apache Jena reasoner framework and rules engine). These queries 600, for example, can express the patterns conditions associated with each scenario (e.g., including the set of identities and actions involved) as a query, and the graph-based query engine can search the graph comprising the ontology model 156 for the existence of patterns matching the specified queries. The query results 602, for example, can include the identification of identities in the graph that are associated with the pattern and conditions defined by the query, thereby providing information about identities associated with privilege escalation scenarios.

Returning to FIG. 1, at circle "6," the privilege escalation analyzer 150 provides access to identifiers of any identity identified as being associated with a privilege escalation scenario in the form of privilege escalation findings 162. In general, the identifiers of identities identified as being associated with a privilege escalation scenario can be provided in any format including, e.g., as identifiers in response to an API request, in text format, in a graphical interface, etc.

Figure 7:
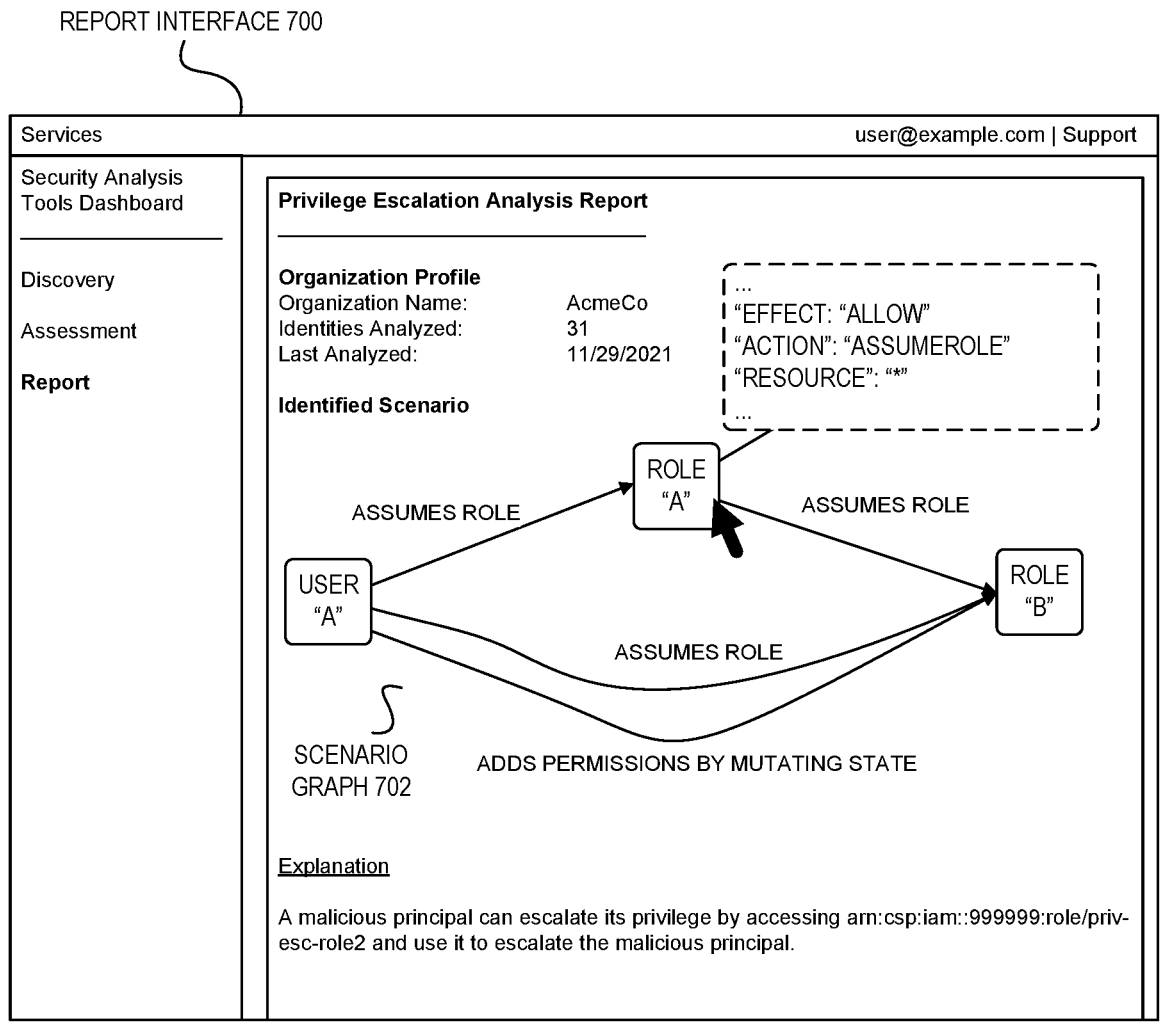
FIG. 7 illustrates an example interface displaying privilege escalation findings based on a privilege escalation analysis according to some embodiments.

FIG. 7 illustrates an example interface displaying privilege escalation findings based on a privilege escalation analysis according to some embodiments. As shown, the report interface 700 includes a privilege escalation analysis report providing information about a complete privilege escalation analysis on a set of identities. In this example, the report interface 700 illustrates one identified scenario, displayed as a scenario graph 702, including a representation of the identities involved (e.g., a user "A", role "A", and role "B") and relationships among the identities. The relationships identify actions that can be performed to escalate the privileges associated with the user "A", including the user assuming each of role "A" and role "B" in a role chain, and adding permissions by mutating the state of the role "B". In some embodiments, a scenario graph 702 further enables users to hover over elements in the graph (e.g., the node representing role "A") to obtain additional information about the scenario, e.g., to view snippets of policies and policy statements causing the privilege escalation scenario to exist.

The report interface 700 further includes a textual explanation of the identified scenarios. Although only one scenario is depicted in the example, such a report interface can display any number of separately identified privilege escalation scenarios involving any number of separate identities. As indicated above, although a graphical report interface is shown, identifiers of identities associated with privilege escalation scenarios can be provided in other forms including as an API response, in text, etc.

In some embodiments, based on one or more identified identities associated with privilege escalation scenarios, users can provide input to modify one or more policies to mitigate the identified scenario(s). For example, using a web-based console or other interface, a user can be directed to the policy fragment(s) causing the scenario to exist and provided with interface elements that enable the user to modify the fragments. In some embodiments, the privilege escalation analyzer 150 can provide suggested modifications to a policy to correct one or more identified privilege escalation, which can be selected by a user for implementation, if desired.

Figure 8:
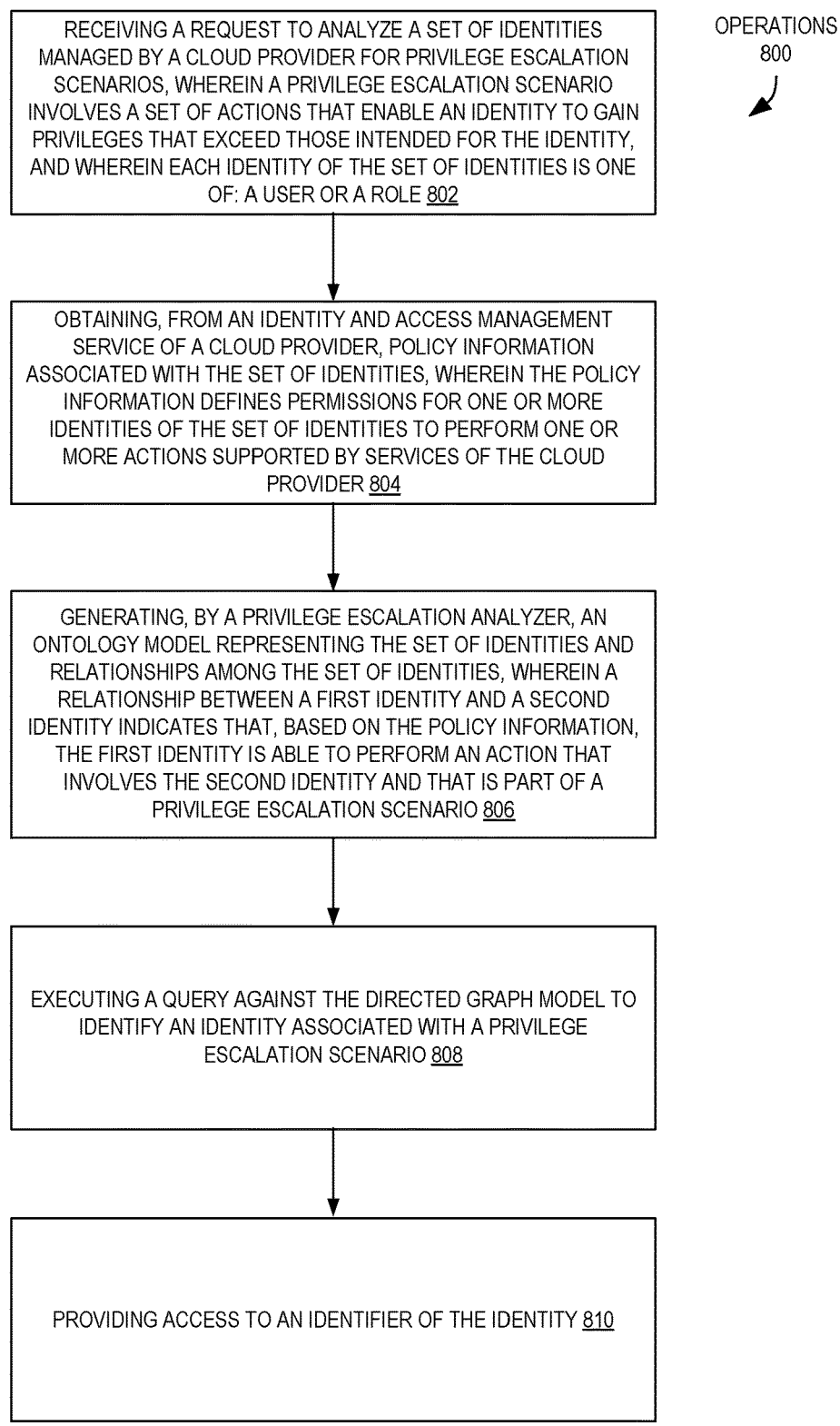
FIG. 8 is a flow diagram illustrating operations of a method for analyzing privilege escalation risks using a multi-layer reasoning framework according to some embodiments.

FIG. 8 is a flow diagram illustrating operations 800 of a method for analyzing privilege escalation risks using a multi-layer reasoning framework according to some embodiments. Some or all of the operations 800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 800 are performed by security analysis tools 152, including a privilege escalation analyzer 150, of the other figures.

The operations 800 include, at block 802, receiving a request to analyze a set of identities managed by a cloud provider for privilege escalation scenarios, wherein a privilege escalation scenario involves a set of actions that enable an identity to gain privileges that exceed those intended for the identity, and wherein each identity of the set of identities is one of: a user or a role.

The operations 800 further include, at block 804, obtaining, from an identity and access management service of a cloud provider, policy information associated with the set of identities, wherein the policy information defines permissions for one or more identities of the set of identities to perform one or more actions supported by services of the cloud provider.

The operations 800 further include, at block 806, generating, by a privilege escalation analyzer, an ontology model representing the set of identities and relationships among the set of identities, wherein a relationship between a first identity and a second identity indicates that, based on the policy information, the first identity is able to perform an action that involves the second identity and that is part of a privilege escalation scenario. In some embodiments, the ontology model is generated using a policy analyzer service and a role reachability analysis service, wherein the policy analyzer service is used to identify permission mutation relationships and credential mutation relationships between identities, and wherein the role reachability analysis service is used to identify role access relationships between identities.

In some embodiments, the ontology model includes vertices corresponding to the set of identities and edges corresponding to the relationships among the set of identities, wherein a relationship between two identities of the set of identities is one of: a permission mutation relationship in which an identity is able to add permissions to itself or to another identity, a credential mutation relationship in which an identity is able to create or update credentials associated with itself or with another identity, or a role access relationship in which an identity can assume a role. In some embodiments, the set of identities and relationships is stored as a collection of triples using the Resource Description Framework (RDF) format or, RDF Schema (RDFS) format, or the Web Ontology Language (OWL) format.

In some embodiments, the set of identities and relationships is stored as a collection of triples, wherein the query expresses a set of conditions corresponding to the privilege escalation scenario, and wherein the query is executed by a query engine used to extract data from graphs. In some embodiments, the privilege escalation scenario involves an identity of the set of identities assuming a role, and wherein a relationship between the identity and the role is identified using a role reachability analysis service. In some embodiments, the ontology model further includes at least one relationship indicating that an identity of the set of identities is permitted to perform an action involving a computing resource, and wherein the action involving the computing resource is part of a privilege escalation scenario. In some embodiments, wherein the relationships among the set of identities includes at least one of: a relationship indicating that an identity can perform an action on itself, or a relationship indicating that a first identity is transitively related to a second identity.

The operations 800 further include, at block 808, executing a query against the directed graph model to identify an identity associated with a privilege escalation scenario.

The operations 800 further include, at block 810, providing access to an identifier of the identity.

In some embodiments, the operations 800 further include for each identity of the set of identities, using a policy analyzer service to determine whether the identity is permitted to perform a permission mutation action; storing, in the ontology model, information indicating which identities are permitted to perform the permission mutation action; querying the directed graph model ontology model to identify identity pairs where at least one identity of each identity pair is permitted to perform the permission mutation action; and for each of the identity pairs, using the policy analyzer service to determine whether a first identity of the identity pair is permitted to perform the permission mutation action on a second identity.

In some embodiments, the operations 800 further include causing display of a report interface including a graph representation of the privilege escalation scenario, wherein the graph representing includes representations of one or more identities involved in the privilege escalation scenario and indications of actions performed by the one or more identities.

In some embodiments, the operations 800 further include receiving input to modify a policy associated with the identity associated with the privilege escalation scenario to mitigate the privilege escalation scenario.

Figure 9:
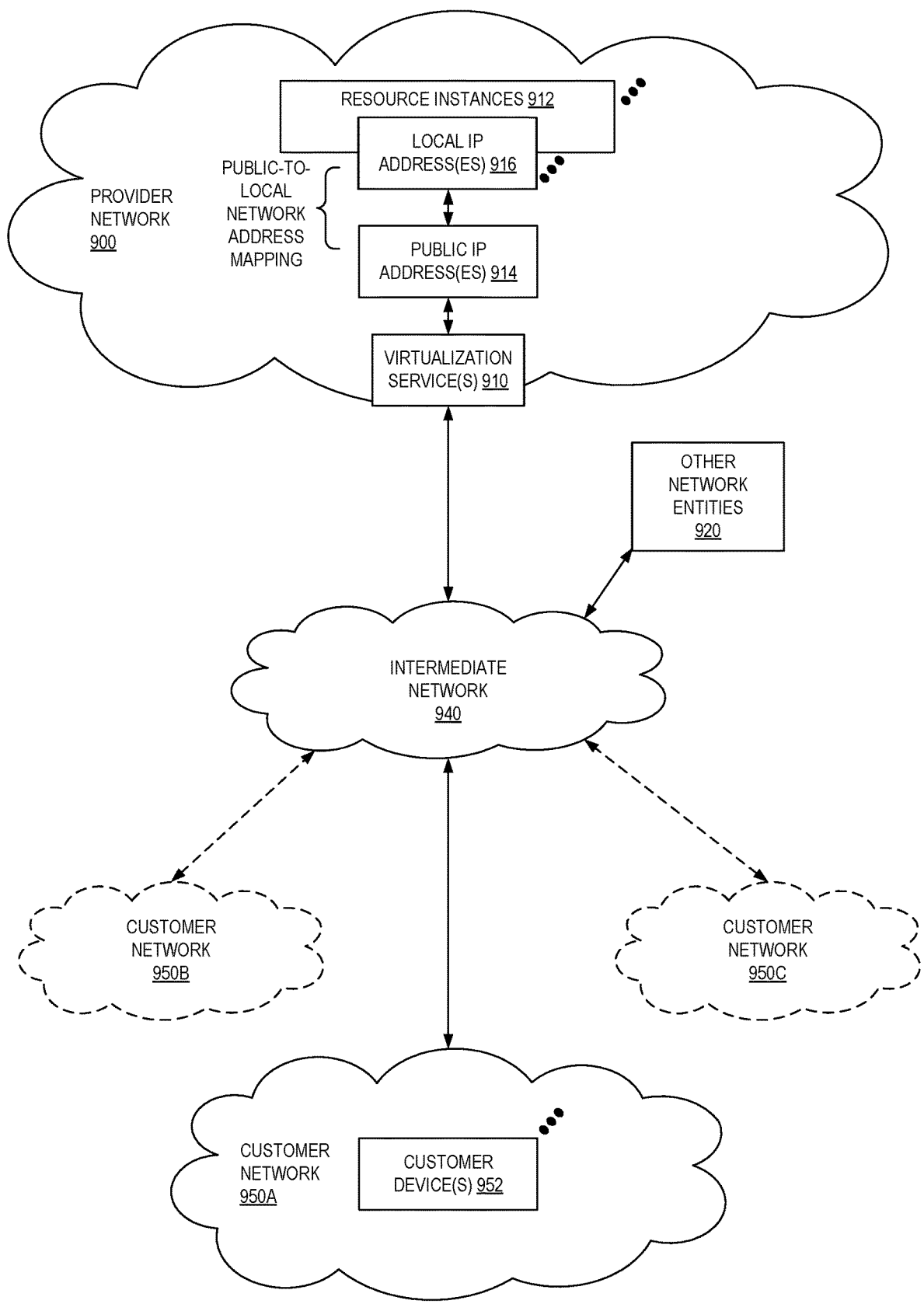
FIG. 9 illustrates an example provider network environment according to some embodiments.

FIG. 9 illustrates an example provider network (or "service provider system") environment according to some embodiments. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some embodiments, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
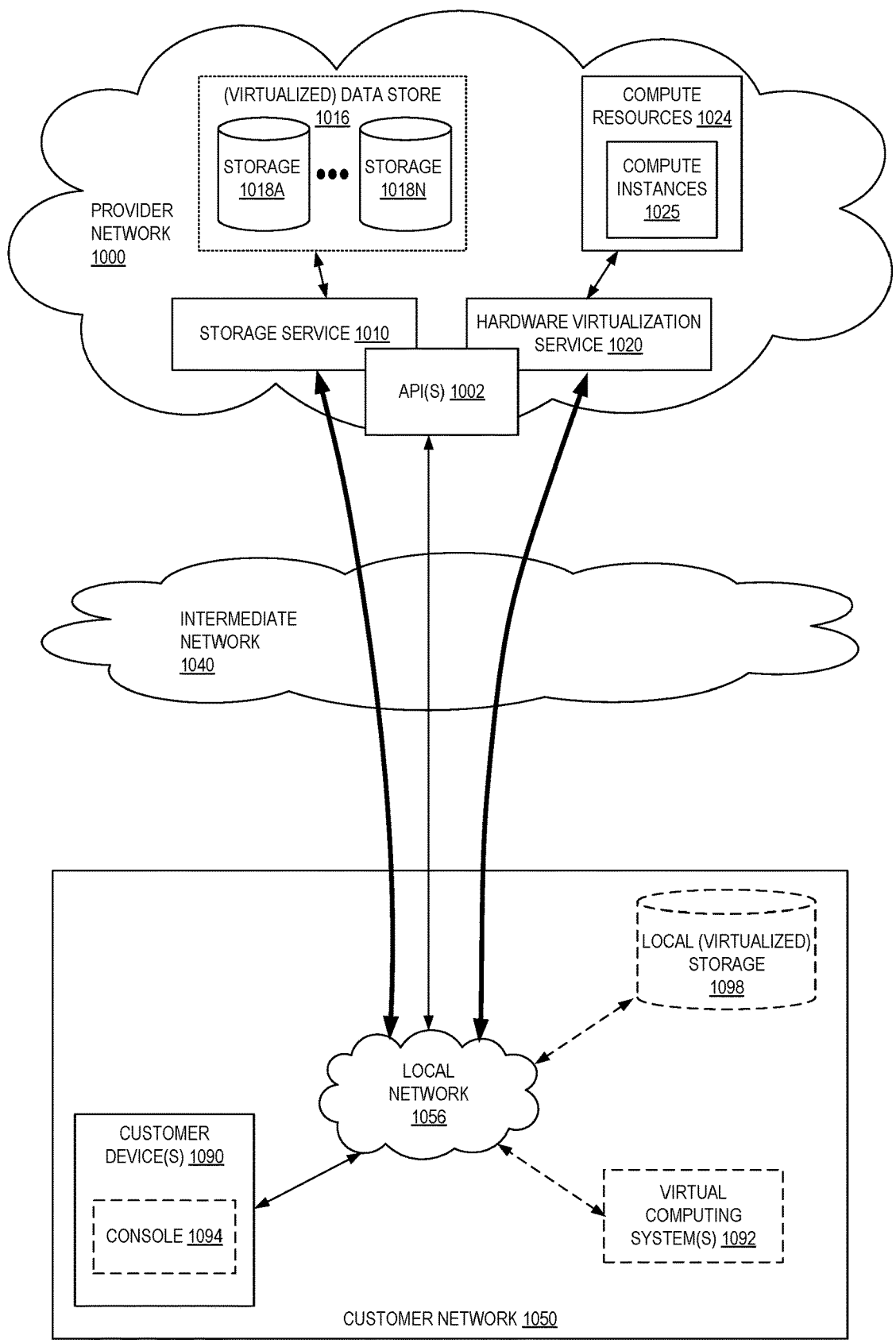
FIG. 10 is a block diagram of an example provider network that provides a storage service and a hardware virtualization service to customers according to some embodiments.

FIG. 10 is a block diagram of an example provider network environment that provides a storage service and a hardware virtualization service to customers, according to some embodiments. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some embodiments, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some embodiments, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual data store 1016 (e.g., a folder or "bucket," a virtualized volume, a database, etc.) provided by the provider network 1000. In some embodiments, a virtualized data store gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized data store 1016) is maintained. In some embodiments, a user, via the virtual computing system 1092 and/or another customer device 1090, can mount and access virtual data store 1016 volumes via the storage service 1010 acting as a storage virtualization service, and these volumes can appear to the user as local (virtualized) storage 1098.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.

Figure 11:
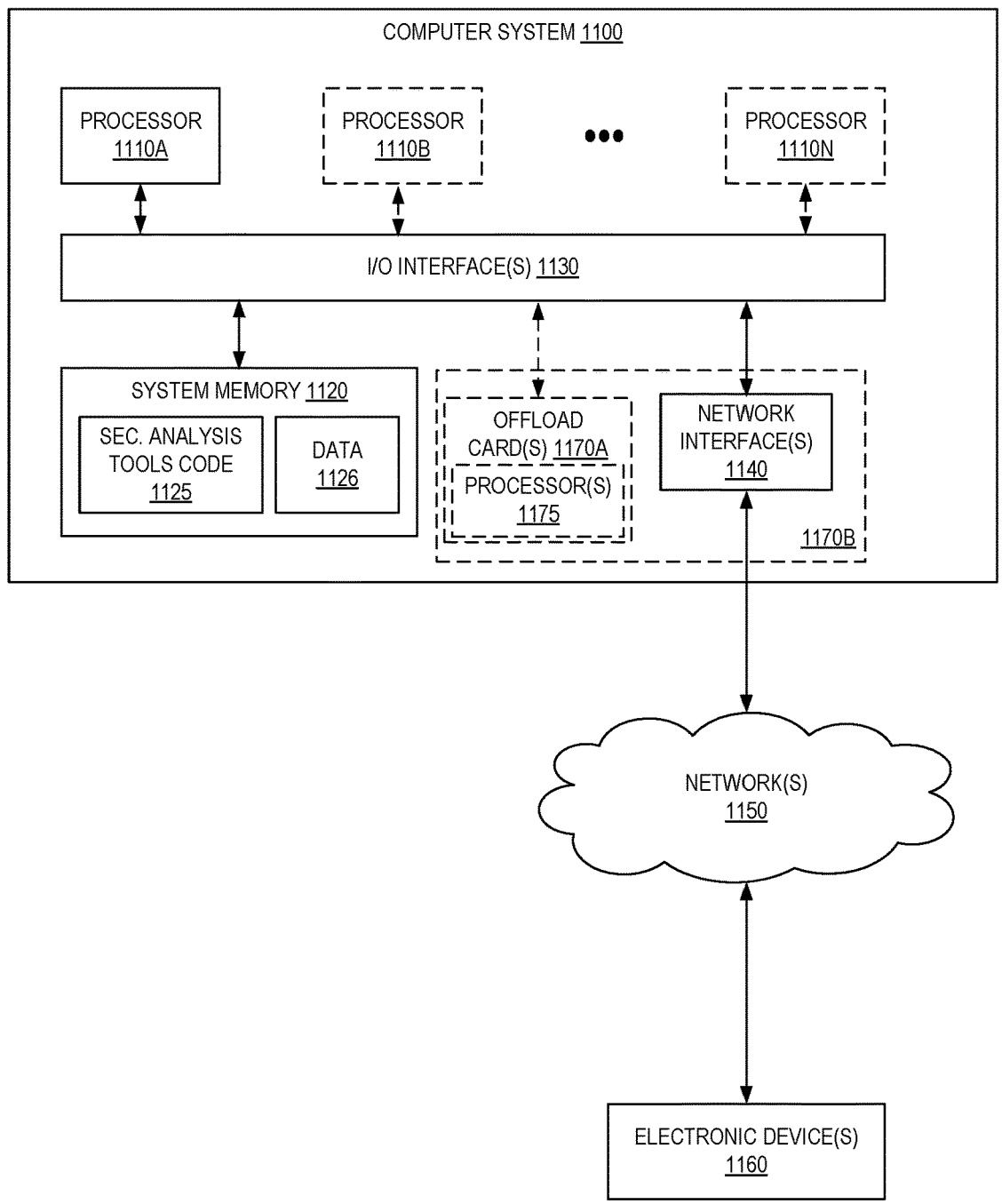
FIG. 11 is a block diagram illustrating an example computer system that can be used in some embodiments.

In some embodiments, a system that implements a portion or all of the techniques described herein can include a general-purpose computer system, such as the computer system 1100 illustrated in FIG. 11, that includes, or is configured to access, one or more computer-accessible media. In the illustrated embodiment, the computer system 1100 includes one or more processors 1110 coupled to a system memory 1120 via an input/output (I/O) interface 1130. The computer system 1100 further includes a network interface 1140 coupled to the I/O interface 1130. While FIG. 11 shows the computer system 1100 as a single computing device, in various embodiments the computer system 1100 can include one computing device or any number of computing devices configured to work together as a single computer system 1100.

In various embodiments, the computer system 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various embodiments, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various embodiments, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1120 as security analysis tool code 1125 (e.g., executable to implement, in whole or in part, the security analysis tools 152, including the privilege escalation analyzer 150) and data 1126.

In some embodiments, the I/O interface 1130 can be configured to coordinate I/O traffic between the processor 1110, the system memory 1120, and any peripheral devices in the device, including the network interface 1140 and/or other peripheral interfaces (not shown). In some embodiments, the I/O interface 1130 can perform any necessary protocol, timing, or other data transformations to convert data signals from one component (e.g., the system memory 1120) into a format suitable for use by another component (e.g., the processor 1110). In some embodiments, the I/O interface 1130 can include support for devices attached through various types of peripheral buses, such as a variant of the Peripheral Component Interconnect (PCI) bus standard or the Universal Serial Bus (USB) standard, for example. In some embodiments, the function of the I/O interface 1130 can be split into two or more separate components, such as a north bridge and a south bridge, for example. Also, in some embodiments, some or all of the functionality of the I/O interface 1130, such as an interface to the system memory 1120, can be incorporated directly into the processor 1110.

The network interface 1140 can be configured to allow data to be exchanged between the computer system 1100 and other devices 1160 attached to a network or networks 1150, such as other computer systems or devices as illustrated in FIG. 1, for example. In various embodiments, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some embodiments the offload card(s) 1170A or 1170B can perform compute instance management operations, such as pausing and/or un-pausing compute instances, launching and/or terminating compute instances, performing memory transfer/copying operations, etc. These management operations can, in some embodiments, be performed by the offload card(s) 1170A or 1170B in coordination with a hypervisor (e.g., upon a request from a hypervisor) that is executed by the other processors 1110A-1110N of the computer system 1100. However, in some embodiments the virtualization manager implemented by the offload card(s) 1170A or 1170B can accommodate requests from other entities (e.g., from compute instances themselves), and can not coordinate with (or service) any separate hypervisor.

In some embodiments, the system memory 1120 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media. e.g., disk or DVD/CD coupled to the computer system 1100 via the I/O interface 1130. A non-transitory computer-accessible storage medium can also include any volatile or non-volatile media such as RAM (e.g., SDRAM, double data rate (DDR) SDRAM. SRAM, etc.), read only memory (ROM), etc., that can be included in some embodiments of the computer system 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers. File Transfer Protocol (FTP) servers. Common Gateway Interface (CGI) servers, data servers. Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment." "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   receiving a request to analyze a set of identities managed by a cloud provider for privilege escalation scenarios, wherein a privilege escalation scenario involves an identity gaining privileges that exceed those intended for the identity, and wherein each identity of the set of identities is one of a user or a role;
   obtaining, from an identity and access management service of the cloud provider, policy information associated with the set of identities, wherein the policy information defines permissions for one or more identities of the set of identities to perform one or more actions supported by services of the cloud provider;
   generating, by an automated reasoning service including a privilege escalation analyzer, a directed graph model by:
      providing, to a policy analyzer service, portions of the policy information to identify relationships among the set of identities, wherein a relationship between two identities of the set of identities is one of: a permission mutation relationship in which an identity is able to add permissions to itself or to another identity, a credential mutation relationship in which an identity is able to create or update credentials associated with itself or with another identity, or a role access relationship in which an identity can assume a role, and
      generating vertices corresponding to the set of identities and edges corresponding to the relationships among the set of identities;
   executing a query against the directed graph model to identify an identity in the set of identities associated with a privilege escalation scenario; and
   returning an identifier of the identity associated with a privilege escalation scenario.

2. The computer-implemented method of claim 1, further comprising:
   for each identity of the set of identities, using the policy analyzer service to determine whether the identity is permitted to perform a permission mutation action;
   storing, in the directed graph model, information indicating which identities in the set of identities are permitted to perform the permission mutation action;
   querying the directed graph model to identify identity pairs in the set of identities where at least one identity of each identity pair is permitted to perform the permission mutation action; and
   for each of the identity pairs, using the policy analyzer service to determine whether a first identity of the identity pair is permitted to perform the permission mutation action on a second identity of the identity pair.

3. The computer-implemented method of claim 1, wherein the automated reasoning service includes the policy analyzer service and a role reachability analysis service, wherein the policy analyzer service is used to identify permission mutation relationships and credential mutation relationships between identities, and wherein the role reachability analysis service is used to identify role access relationships between identities.

4. A computer-implemented method comprising:
   receiving a request to analyze a set of identities managed by a cloud provider for privilege escalation scenarios, wherein each identity of the set of identities is one of a user or a role;
   obtaining, from an identity and access management service of a cloud provider, policy information associated with the set of identities, wherein the policy information defines permissions for one or more identities of the set of identities to perform one or more actions supported by services of the cloud provider;
   generating, by a privilege escalation analyzer, an ontology model representing the set of identities and relationships among the set of identities, wherein a relationship between a first identity in the set of identities and a second identity in the set of identities indicates that, based on the policy information, the first identity is able to perform an action that involves the second identity and that is part of a privilege escalation scenario;
   executing a query against the ontology model to identify an identity in the set of identities associated with a privilege escalation scenario; and
   returning an identifier of the identity associated with a privilege escalation scenario.

5. The computer-implemented method of claim 4, further comprising:
   for each identity of the set of identities, using a policy analyzer service to determine whether the identity is permitted to perform a permission mutation action;
   storing, in the ontology model, information indicating which identities in the set of identities are permitted to perform the permission mutation action;
   querying the ontology model to identify identity pairs in the set of identities where at least one identity of each identity pair is permitted to perform the permission mutation action; and
   for each of the identity pairs, using the policy analyzer service to determine whether a first identity of the identity pair is permitted to perform the permission mutation action on a second identity of the identity pair.

6. The computer-implemented method of claim 4, wherein the ontology model is generated using a policy analyzer service and a role reachability analysis service, wherein the policy analyzer service is used to identify permission mutation relationships and credential mutation relationships between identities, and wherein the role reachability analysis service is used to identify role access relationships between identities.

7. The computer-implemented method of claim 4, further comprising causing display of a report interface including a graph representation of the privilege escalation scenario, wherein the graph representing includes representations of one or more identities involved in the privilege escalation scenario and indications of actions performed by the set of identities.

8. The computer-implemented method of claim 4, wherein the ontology model includes vertices corresponding to the set of identities and edges corresponding to the relationships among the set of identities, wherein a relationship between two identities of the set of identities is one of: a permission mutation relationship in which an identity is able to add permissions to itself or to another identity, a credential mutation relationship in which an identity is able to create or update credentials associated with itself or with another identity, or a role access relationship in which an identity can assume a role.

9. The computer-implemented method of claim 4, wherein the set of identities and relationships is stored as a collection of triples using the Resource Description Framework (RDF) format, RDF Schema (RDFS) format, or the Web Ontology Language (OWL) format.

10. The computer-implemented method of claim 4, wherein the set of identities and relationships is stored as a collection of triples, wherein the query expresses a set of conditions corresponding to the privilege escalation scenario, and wherein the query is executed by a query engine used to extract data from graphs.

11. The computer-implemented method of claim 4, wherein the privilege escalation scenario involves an identity of the set of identities assuming a role, and wherein a relationship between the identity and the role is identified using a role reachability analysis service.

12. The computer-implemented method of claim 4, wherein the ontology model further includes at least one relationship indicating that an identity of the set of identities is permitted to perform an action involving a computing resource, and wherein the action involving the computing resource is part of a privilege escalation scenario.

13. The computer-implemented method of claim 4, wherein the relationships among the set of identities include at least one of a relationship indicating that an identity can perform an action on itself, or a relationship indicating that a first identity is transitively related to a second identity.

14. The computer-implemented method of claim 4, further comprising receiving input to modify a policy associated with the identity associated with the privilege escalation scenario to mitigate the privilege escalation scenario.

15. A system comprising:
a first one or more electronic devices to implement a privilege escalation analyzer in a multi-tenant provider network, wherein the privilege escalation analyzer includes instructions that upon execution cause the privilege escalation analyzer to:
receive a request to analyze a set of identities managed by a cloud provider for privilege escalation scenarios, wherein a privilege escalation scenario involves a set of actions that enable an identity to gain privileges that exceed those intended for the identity, and wherein each identity of the set of identities is one of a user or a role,
obtain, from an identity and access management service of a cloud provider, policy information associated with the set of identities, wherein the policy information defines permissions for one or more identities of the set of identities to perform one or more actions supported by services of the cloud provider,
generate, by a privilege escalation analyzer, an ontology model representing the set of identities and relationships among the set of identities, wherein a relationship between a first identity in the set of identities and a second identity in the set of identities indicates that, based on the policy information, the first identity is able to perform an action that involves the second identity and that is part of a privilege escalation scenario, and wherein the generating the ontology model includes providing portions of the policy information to a policy analyzer service,
execute a query against the ontology model to identify an identity in the set of identities associated with a privilege escalation scenario, and
return an identifier of the identity associated with a privilege escalation scenario; and
a second one or more electronic devices to implement a policy analyzer service in the multi-tenant provider network, wherein the policy analyzer service includes instructions that upon execution cause the policy analyzer service to:
receive the portions of the policy information, and
determine whether the first identity is able to perform the action involving the second identity.

16. The system of claim 15, wherein the privilege escalation analyzer includes instructions that upon execution further cause the privilege escalation analyzer to:
for each identity of the set of identities, using a policy analyzer service to determine whether the identity is permitted to perform a permission mutation action;
storing, in the ontology model, information indicating which identities in the set of identities are permitted to perform the permission mutation action;
querying the ontology model to identify identity pairs in the set of identities where at least one identity of each identity pair is permitted to perform the permission mutation action; and
for each of the identity pairs, using the policy analyzer service to determine whether a first identity of the identity pair is permitted to perform the permission mutation action on a second identity of the identity pair.

17. The system of claim 15, wherein the ontology model is generated using a policy analyzer service and a role reachability analysis service, wherein the policy analyzer service is used to identify permission mutation relationships and credential mutation relationships between identities, and wherein the role reachability analysis service is used to identify role access relationships between identities.

18. The system of claim 15, wherein the privilege escalation analyzer includes instructions that upon execution further cause the privilege escalation analyzer to cause display of a report interface including a graph representation of the privilege escalation scenario, wherein the graph representing includes representations of one or more identities involved in the privilege escalation scenario and indications of actions performed by the set of identities.

19. The system of claim 15, wherein the ontology model includes vertices corresponding to the set of identities and edges corresponding to the relationships among the set of identities, wherein a relationship between two identities of the set of identities is one of: a permission mutation relationship in which an identity is able to add permissions to itself or to another identity, a credential mutation relationship in which an identity is able to create or update credentials associated with itself or with another identity, or a role access relationship in which an identity can assume a role.

20. The system of claim 15, wherein the set of identities and relationships is stored as a collection of triples using the Resource Description Framework (RDF) format, RDF Schema (RDFS) format, or the Web Ontology Language (OWL) format.

* * * * *